Nov. 26, 1940. M. SORKIN 2,222,991
MANUFACTURE OF PRINTING PLATES
Filed Nov. 2, 1937 3 Sheets-Sheet 1
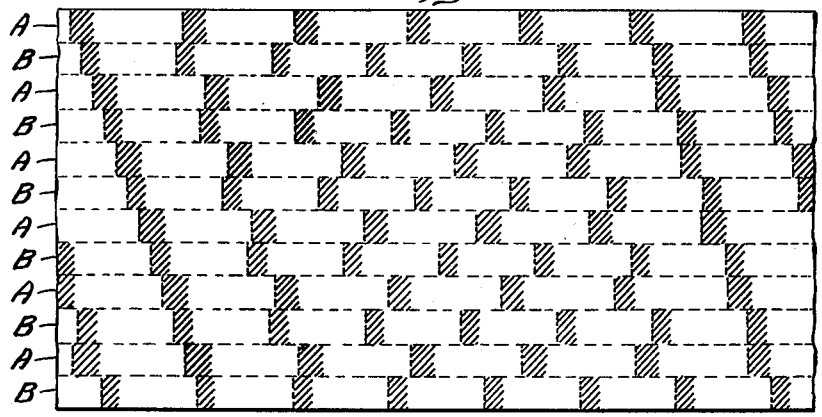
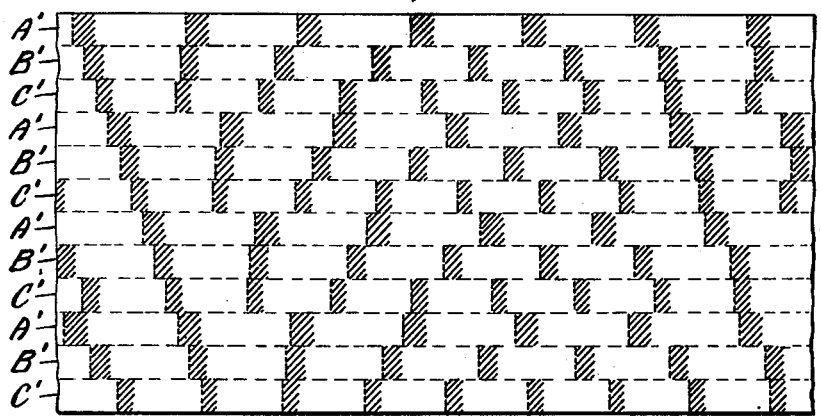
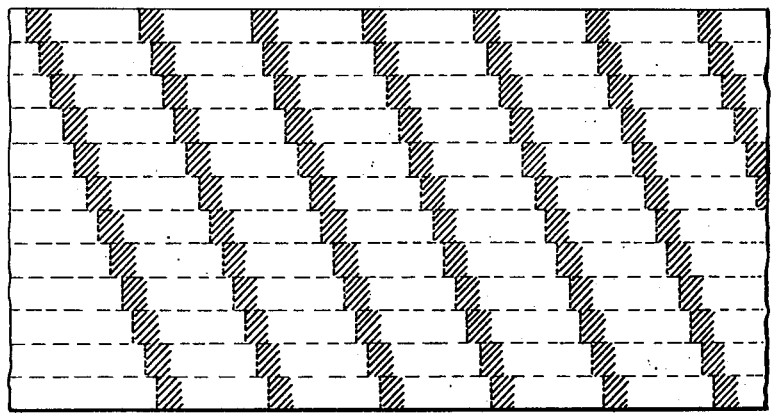
INVENTOR
Morris Sorkin
BY
Robert W. Byerly
ATTORNEY

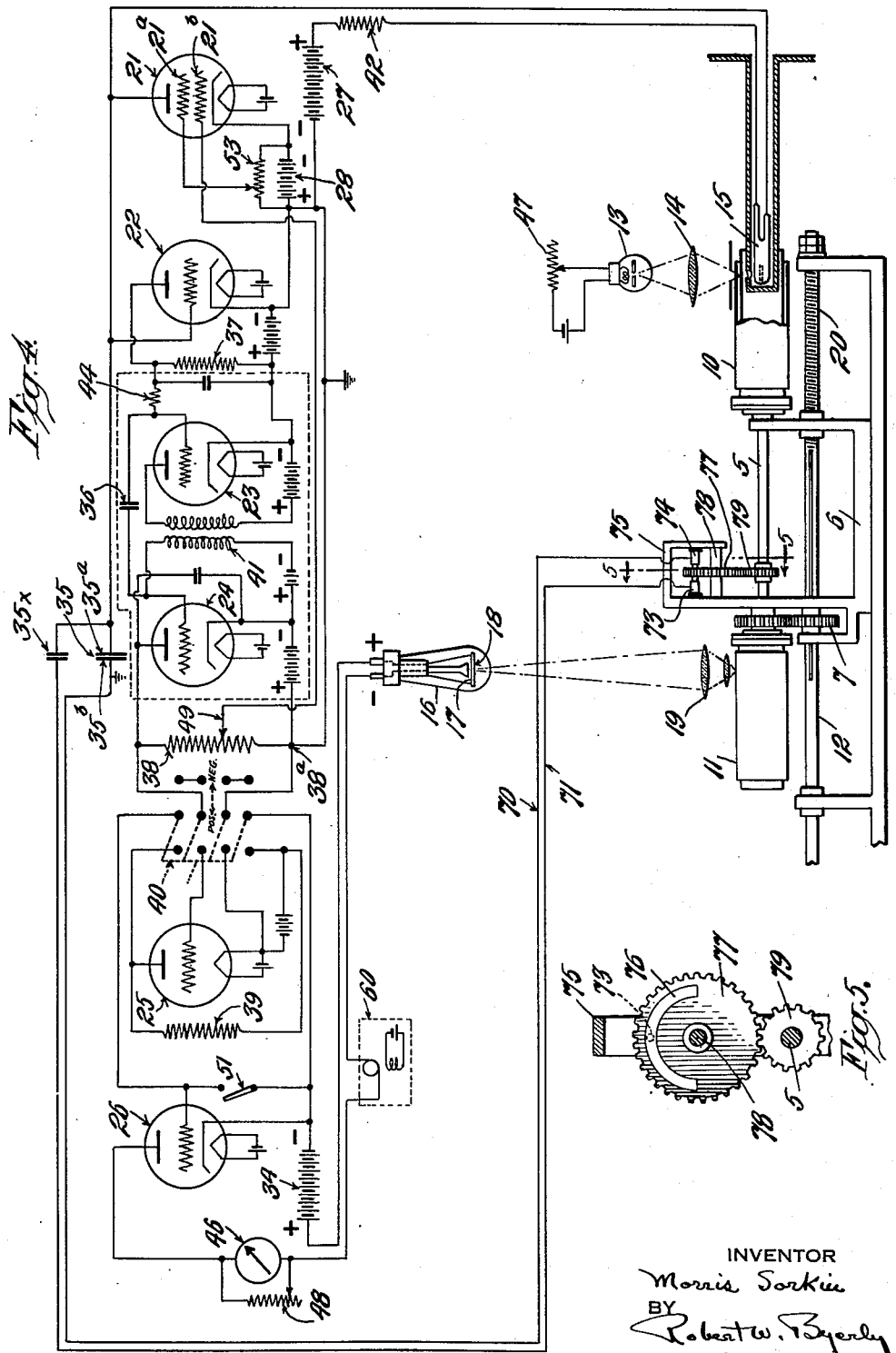

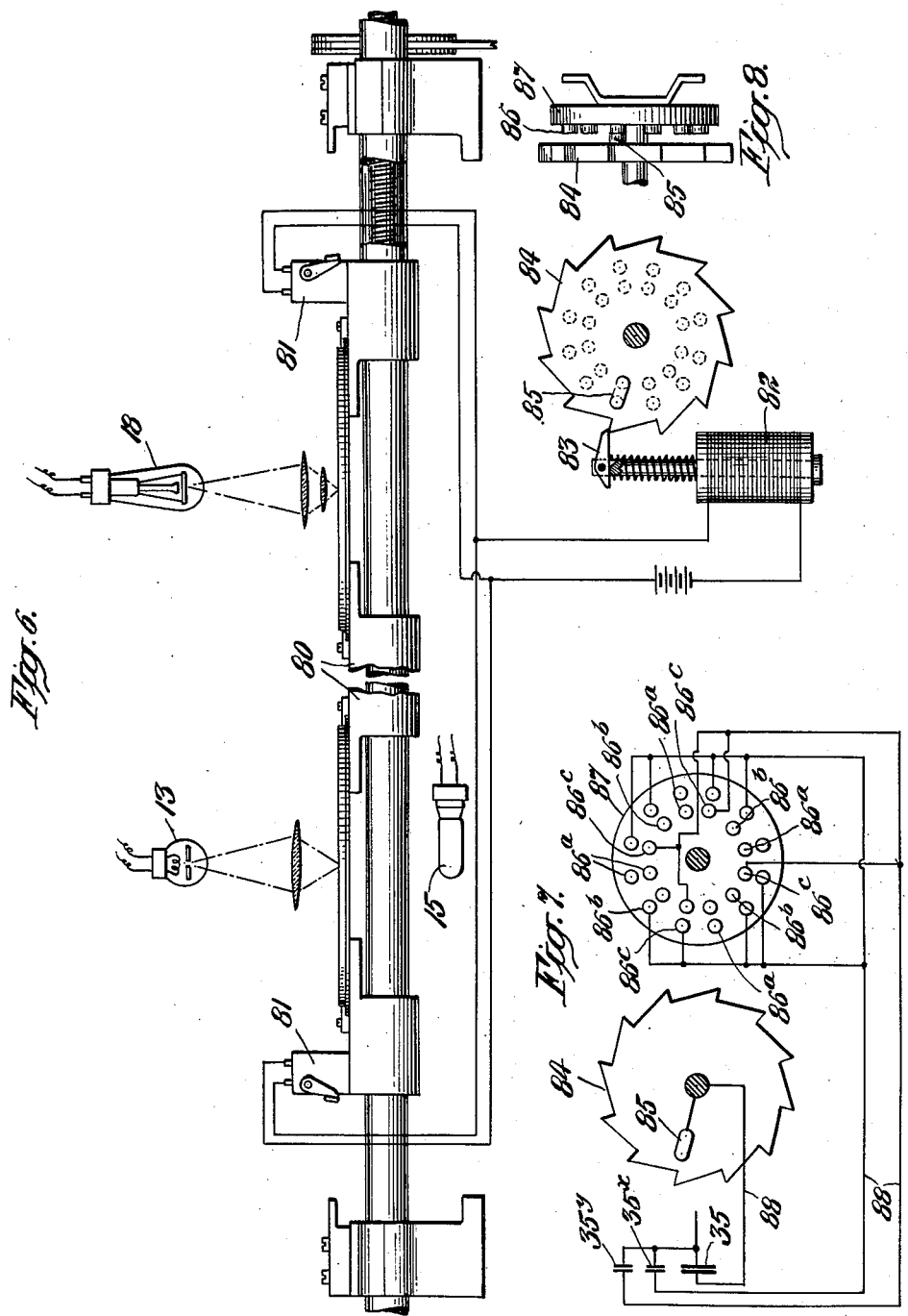

Patented Nov. 26, 1940

2,222,991

UNITED STATES PATENT OFFICE 2,222,991

MANUFACTURE OF PRINTING PLATES

Morris Sorkin, Teaneck, N. J., assignor to Interchemical Corporation, New York, N. Y., a corporation of Ohio Application November 2, 1937, Serial No. 172,355

6 Claims. (Cl. 178—6.7)

This invention relates to contrast images for making printing plates, and to methods of making such contrast images. The present application relates to such methods, while the contrast images form the subject-matter of my divisional application Serial No. 359,644, filed October 4, 1940.

The invention aims to provide a printing plate from which one may make prints containing printed and unprinted areas so proportioned and arranged as to give to the eye the effect of the variations in tone of an original subject or a continuous-tone photographic image thereof. Such a print I shall term a "contrast image" of the original to indicate that it contains only two contrasting tones, variations in the areas of which are utilized to simulate continuous variation in tone.

In order that a contrast image may give to the eye the effect of the tone variations of a continuous-tone image, the black and the white areas are so arranged and proportioned that the ratio of black area to white area corresponds to the tone of the original in each part of the contrast image. The area of the contrast image thus consists of a large number of small elemental areas, each of which includes a black area and a white area so proportioned that the ratio of the size of the black area to the size of the whole elemental area corresponds (more or less closely according to the method used) to the tonal value of the area of the continuous-tone original corresponding to this elemental area of the contrast image. In order to save repetition and to simplify the terminology used in this application, I shall refer to such an elemental area in which the ratio of black area to the total area corresponds to the value of the tone of the corresponding area of the continuous-tone original as an "element" of the area of the contrast image.

My invention relates to the type of contrast image which differs from the ordinary half-tone image in that the elements of the image corresponding to different tones are of different sizes. In such contrast images, which are ordinarily prepared by photo-electric scanning, the larger elements, for example, those representing the lighter tones, are usually much greater in length than in width. It has been found that objectionable patterns occur in certain more or less constant tone areas of such images where the elements are long. These are usually lines extending transversely to the long dimension of the elemental areas.

I have discovered that it is possible to eliminate such objectionable lines by making, between adjacent rows of elements, a slight change in the length of the element representing each tone. My invention based on this discovery provides a contrast image free from objectionable pattern effects and consisting of rows of elements of different lengths representing different tones, the lengths of the elements representing each tone being different in adjacent rows.

My invention includes also a photo-electric scanning apparatus for producing such a contrast image. In the scanning apparatus heretofore used for making contrast images having elements of different lengths, it has been customary to control the length of either the black or the white part of each element, or both the black and the white parts, by the time required for the charging or discharging of an electric condenser by a current controlled by a photo-electric cell scanning the original to be reproduced. In accordance with my invention, such apparatus is modified by introducing mechanism operative at each scanning line to vary the time cycle of the charging and discharging, as, for example, by making a change in the capacity of the condenser.

I will explain my invention in detail in connection with the annexed drawings, in which:

Fig. 1 is a greatly enlarged view of part of the contrast image embodying my invention;

Fig. 2 is a similar view of a somewhat more desirable form of contrast image embodying my invention;

Fig. 3 is a similar view showing the objectionable pattern effect which has occurred in previous contrast images;

Fig. 4 is a diagram of a photo-electric scanning apparatus of the drum type embodying my invention;

Fig. 5 is a vertical section on an enlarged scale taken on the line 5—5 of Fig. 4;

Figs. 6 and 7 are diagrams showing a photo-electric scanning apparatus of the table type embodying my invention, omitting the parts of the electric circuit which are the same as in the drum type scanning apparatus of Fig. 4; and Fig. 8 is an edge view of the ratchet and disc shown in Figs. 6 and 7.

Fig. 1 shows a light, constant-tone area of a contrast image embodying my invention. This area consists of a series of rows of long narrow elements, each of which contains a large white area and a small black area. The ratio of the black area of each element to the total area of the element corresponds to the tone represented. Although all the elements represent the same tone, the length of the elements in the alternate rows A is greater than the length of the elements in the other alternate rows B, so that definite objectionable lines cannot be produced as in the former type of contrast image illustrated in Fig. 3. Both the long white areas and the short black areas are proportionately reduced in length in the alternate rows, so that, notwithstanding the difference in the length of the elements in the alternate rows, the black and white areas of each element correctly represent an area of the original which is of uniform tone.

Fig. 2 shows a light, constant-tone area of a contrast image embodying my invention in a still more desirable form. In this case, the elements representing the tone are of three different lengths. Those in the rows A' are the longest, those in the rows C' the shortest, and those in the rows B' intermediate between the two. This still more effectively eliminates pattern effects.

A scanning apparatus for making the type of contrast image shown in Fig. 1 is illustrated in Figs. 4 and 5. It includes an ordinary electromechanical scanning apparatus having mechanism for moving an original and a copy in a series of corresponding scanning lines. This mechanism comprises a transparent picture drum 10 and a recording drum 11, which are given identical rotational and longitudinal movements through a driving mechanism 12. A constant intensity lamp 13 regulated by resistance 47 and provided with a suitable lens system 14 is mounted to scan a continuous-tone transparent original or a continuous-tone transparent photograph of an original mounted on the drum 10. The light from the scanning lamp 13, as modified by passing through the transparent original, is received by a photo-electric cell 15.

A recording lamp 16 illuminating a shield 17 containing a long narrow slit or aperture 18 is provided with a lens system 19 which focuses an image of the slit 18 on a recording film placed on the drum 11. In the form illustrated, the shield 17 containing the slit 18 is the anode of the lamp, but this is not essential as the shield containing the slit may be separate from the lamp. The lamp is a gas-discharge lamp having no afterglow. The length of the image of the slit 18 is equal to the distance between the turns of the screw 20 of the driving mechanism, so that, as the mechanism operates, the image of the slit scans the entire area of the recording film without any overlap. The length of the image of the slit 18 on the recording film determines the width of the elemental areas of the contrast image produced on the recording film. The lengths of the elemental areas are determined by the time length of the cycle of the recording lamp 18; and the proportion of black and white which each elemental area contains is determined by the time during which the recording lamp 16 is lighted and the time period during which it is extinguished during one cycle. These time periods are controlled by the light passing through the original to the photo-electric cell 15 by means of interconnecting electric circuits between the photo-electric cell 15 and the recording lamp 16.

The interconnected electric circuits include a photo-cell circuit which charges a condenser 35, a constant current circuit which discharges the condenser 35, a trigger circuit actuated by the voltage across the condenser 35, and a control circuit for the recording lamp 16 actuated by the trigger circuit. The circuits are so interconnected that the condenser 35 is alternately charged and discharged in a cycle controlled by the amount of light reaching the photo-cell 15 and controlling the cycle of the recording lamp 16 and thus the length and character of the elemental areas of the contrast image.

The photo-cell circuit contains a source of electromotive force 27, a resistance 42 and the photo-electric cell 15, and is connected to the plate 35a of the condenser so that a positive potential is built up on this plate when the current flows in the photo-cell circuit. The current in this circuit and the rate of charge of the condenser are proportional to the amount of light reaching the photo-cell.

The discharging circuit is connected to the plate 35a of the condenser and contains a source of electro-motive force 28 opposed to the source of electro-motive force 27 in the photo-cell circuit. The discharging circuit also contains means for maintaining the flow of current constant and means for stopping and starting the flow of current. These means consist of a vacuum tube 21 whose plate circuit constitutes a part of the discharging circuit. The tube 21 contains a grid 21a maintained at a constant potential and holding the flow of current in the plate circuit at a constant value greater than the greatest current in the photo-cell circuit. While greater than the current in the photo-cell circuit, the discharging current should be of the same order as that in the photo-cell circuit which requires that the tube 21 be operated at very low voltage. The strength of the discharging current may be regulated by a potentiometer 53 connected to the grid 21a and spanning the source of electro-motive force 28. The discharging current is most desirably made equal to the sum of the maximum and minimum values of the charging current, that is, the values of the current in the photo-cell circuit when the maximum and minimum amounts of light are received on the photo-cell. The tube 21 also contains a control grid 21b which permits the plate current to flow when it is neutral with respect to the cathode of the tube and cuts off the flow of current when it is at a certain negative bias with respect to the cathode of the tube. This grid is connected by a variable tap 49 to the resistor 38 of the trigger circuit hereinafter described. When the current is flowing in the discharging circuit, it reduces the positive charge on the plate 35a, because the current in this circuit is greater than the current in the photo-cell by which it is opposed.

The trigger circuit is actuated by the voltage across the condenser 35 in such manner as to cause a drop in potential in the resistor 38 when the condenser voltage has fallen below a predetermined value (which, for convenience, I shall term "the low trigger value") and to eliminate the drop in potential in the resistor 38 when the condenser voltage rises above a predetermined value ("the high trigger value"). The trigger circuit includes a vacuum tube 22 whose grid is connected to the plate 35a of the condenser and whose plate circuit is connected to cause a flow of current through a resistor 37. The resistor 37 is connected through an oscillator and detector (enclosed in dotted lines in Fig. 4) to the resistor 38. The operation of this oscillator and detector (hereinafter described in detail) is such that it causes a flow of uni-directional current through the resistor 38 when the flow of current through the resistor 37 is such as occurs in the plate circuit of the tube 22 when its grid falls below the low trigger value, and cuts off this current through the resistor 38 when the potential of the grid of the tube 22 rises above the high trigger value.

The control circuit for the recording lamp 16 is connected to the resistor 38 of the trigger circuit, and serves to keep the recording lamp 16 lighted only when there is a drop in potential in the resistor 38 or only when there is no drop in potential across this resistor, according to the setting of a reversing switch 40. The control circuit includes a source of electro-motive force 34, the recording lamp 16, and the plate circuit of a tube 26. Current flows in this circuit only when the grid of the tube 26 is neutral. When the reversing switch is in the position marked "Neg.", this occurs only when there is no drop across the resistor 38, which in turn occurs when the oscillator and detector are in the static condition. With the switch in the same position, and the oscillator and detector in the dynamic condition, the drop across resistor 38 provides sufficient negative bias to the tube 26 to prevent flow of any plate current therein. Therefore, the recording lamp 16 is lighted when the oscillator and detector are in the static condition, which occurs during that part of the cycle when the discharging tube 21 is passing plate current. If the area being scanned at this moment is highly transparent, the charging current due to the photo-cell will be large. Therefore, as this opposes the discharging of the condenser, this part of the cycle will be long and will produce a long black dot. Similarly, the recording lamp is off when the oscillator and detector are in the dynamic condition, which occurs during that part of the cycle when the condenser 35 is being charged up to the "high trigger value" by the charging current. If the area being scanned is transparent, this charging of the condenser will take place rapidly and a small white space will be formed. This results, therefore, in making a negative contrast image of a positive subject on the drum 10. When the switch 40 is thrown to the position marked "Pos." in Fig. 4, the grid circuit of the tube 26 is connected across a resistor 39 in the plate circuit of a tube 25 whose grid is then connected to the low end of the resistor 38. In this case, the current in the plate circuit of the tube 26 and the recording lamp 16 flows only when there is no current in the plate circuit of the tube 25, that is, when there is a potential drop in the resistor 38. In this case, a positive contrast image is made.

The operation of the interconnected circuits which have been described is cyclic and may conveniently be described by beginning at the end of the discharge of the condenser 35. At this time, there is a potential drop in the resistor 38, as the condenser voltage is below the trigger values; if the reversing switch is in the positive position, the recording lamp is on and no current is flowing in the discharge circuit which includes the plate circuit of the tube 21. The condenser, therefore, becomes charged by the current flowing through the photo-cell circuit, and the charge continues to increase until it reaches the high trigger value. At this point, the trigger circuit operates to stop the flow of current in the resistor 38 and eliminating the potential drop in this resistor. The elimination of the potential drop in the resistor 38 eliminates the negative bias on the control grid 21b of the tube 21 and starts the flow of current in the discharge circuit. It also operates the control circuit to extinguish the recording lamp 16. Following these two effects of the elimination of the voltage drop in the resistor 38, which take place simultaneously, the condenser voltage decreases, since the current in the discharging circuit is greater than the current in the photo-electric circuit which is opposing it. The discharge of the condenser continues until its voltage reaches the low trigger value. The trigger circuit then starts a flow of current through the resistor 38, causing a potential drop in this resistor. The potential drop in the resistor 38 produces a negative bias on the control grid 21b of the tube 21 sufficient to stop the flow of current in the discharge circuit. It also lights the recording light 16. This completes the cycle and the charging of the condenser by the current in the photo-cell circuit begins again.

A milliammeter 46 may be connected in the recording lamp circuit to indicate the proportion of black in the contrast image and may be adjusted by a variable shunt 48 to read 100 when the recording light is operated without interruption, a condition which may be attained by closing a switch 51 to maintain a constant potential on the grid of tube 26. An ampere hour meter 60, connected in the recording lamp circuit, may be used for indicating the total black area in the contrast image.

In the cyclic operation which has been described, the rate at which the condenser is charged and discharged and consequently the frequency of the cyclic operation depends upon the capacity and other constants of the cyclic circuit and also upon the strength of the photo-cell current fed to the circuit. At any fixed value of the electrical constants of the cyclic circuit, which determine the so-called time constant of the circuit, the rate at which the condenser is charged is proportional to the amount of light reaching the photo-cell, as this determines the strength of the current in the photo-cell circuit; and the rate at which the condenser is discharged in an inverse function of the amount of light reaching the photo-cell, since the photo-cell current opposes the constant current in the discharging circuit. The time intervals of the charging and discharging of the condenser depend upon the charging and discharging rates and determine the lengths of the black and white portions of each element of the contrast image. This results in making the ratio of black area to total area of each element equal to the value of the tone of the corresponding portion of the original.

When a dark tone area of the original is between the scanning lamp and the photo-cell, the photo-cell current is weak, so that the charging of the condenser to the high trigger value takes a long period of time making a long black area on the contrast image, and the discharge of the condenser is rapid making a short white area. Because of the slowness of the charging, the whole cycle is long, and consequently the elemental area is long.

When a light tone area of the original lies between the scanning lamp and the photo-cell, the photo-cell current is large, charging the condenser rapidly and opposing the discharging current so that the discharge is slow. This also results in a long cycle producing a long elemental area which, in this case, contains a long white area and a short black area.

When the middle tone of the original is between the scanning lamp and the photo-cell, the current in the photo-cell circuit is half the current in the discharge circuit, so that the time of charging the condenser and the time of discharging the condenser are equal and comparatively short, giving the minimum length of cycle and producing a short elemental area which is half black and half white. Under these circumstances, the frequency of the cyclic operation of the cycle circuit is at a maximum.

Thus, the scanning apparatus which has been described produces a contrast image in which the elements representing different tones differ in size. I make no claim to the apparatus and circuits thus far described, as they constitute the subject-matter of Hardy Patent No. 2,136,340, issued November 8, 1938. My invention comprises means which may be combined with this circuit for causing periodic changes in the sizes of the elements without varying the relation between the sizes of the elements representing different tones and without varying the proportion of black to white in each element. It accomplishes this result by causing a proportional variation in the times required for charging and discharging the condenser for each value of the photo-cell current.

My invention may most simply be incorporated in a scanning device of the type which has been described—that is to say, in one which has an electric circuit having a cyclic operation—by introducing means operated periodically, most desirably at the end of each scanning line, to modify the electric circuit by altering one of its constants. Such alteration makes a change in the maximum frequency of the cyclic operation of the circuit which, as stated above, occurs at a middle tone of the original. Equal percentage changes are also caused in the lower frequencies of the cyclic operation of the circuit which, as noted above, occur in light and dark tone areas of the original. Such alteration of the time constant of the circuit may, for example, be effected by changing the amount of the capacity contained in the circuit.

The specific embodiment of my invention, shown in Figs. 4 and 5, includes an auxiliary condenser 35x and a switch operated by the mechanism for moving the drums 10 and 11 to connect this condenser in parallel with the condenser 35 of the scanning circuit during alternate revolutions of the drums, that is, during alternating scanning lines.

The auxiliary condenser 35x is connected in parallel with a condenser 35 by wires 70, 71 which are connected to brushes 73, 74 mounted on a rigid arm 75 secured to the frame 6. These brushes are adapted to contact a semi-circular conductor 76 inset in a fibre gear 77 which is mounted on a shaft 78 carried by the arm 75. The gear 77 meshes with a gear 79 secured to shaft 5 and may be twice the size of the latter gear, so that the brushes complete the circuit through condenser 35x, and thus connect it in parallel with the condenser 35, during one out of each two revolutions of the drums 10 and 11 so that the capacity of the circuit is changed at the end of each scanning line. This results in varying the length of the elements representing each tone in alternate lines of elements, without varying the proportion of black to white in each element, as shown in Fig. 1.

Another specific embodiment of my invention is shown in Figs. 6, 7 and 8. It is incorporated in a scanning device which is like that which has been described, except that the original scanned by the light 13 and the contrast image produced by the recording light 18 are supported on a reciprocating table 80 instead of upon rotating drums. As is usual in such arrangements, means (not shown) are provided for giving the table 80 a slight lateral movement at the end of each of its strokes in each direction, so that each stroke of the table in each direction represents one scanning line. The reciprocatory movement of the table is utilized to close one or the other of two switches 81 at the end of each stroke. The switches are connected to a solenoid 82 which operates a pawl 83 which causes a step-by-step movement of a ratchet 84 carrying an electric terminal 85. At each scanning line, this terminal comes into contact with two of a number of fixed terminals 86 on a disc 87 of insulating material adjacent to the ratchet. In the form shown, there are twelve pairs 86a, 86b, 86c of fixed terminals 86, so that the terminal 85 on the ratchet contacts with the twelve pairs of fixed terminals successively during twelve successive scanning lines.

The contact between the terminal on the ratchet and the fixed terminals is utilized to make the effective capacity of the condenser 35 of the scanning apparatus different in adjacent scanning lines by connecting one or more auxiliary condensers in parallel with it. In the form shown diagrammatically in Fig. 7, there are two auxiliary condensers 35x and 35y. A circuit provided by wires 88 serves to connect either or both of the auxiliary condensers in parallel with the main condenser 35. When the ratchet terminal 85 is in contact with the fixed terminals 86a, neither auxiliary condenser is connected. When it is in contact with the fixed terminals 86b, the auxiliary condenser 35x is connected in parallel with the main condenser, and when it is in contact with the terminals 86c, both auxiliary condensers are connected in parallel with the main condenser. This results in varying the length of the elements representing each tone in the manner shown in Fig. 2.

My invention may also be applied to the type of scanning apparatus shown in Ranger Patent No. 1,848,839 or to the type of scanning apparatus shown in Ranger Patent No. 1,790,722, by utilizing apparatus such as that shown in Fig. 5 to connect auxiliary condensers in parallel with the condensers used in the Ranger circuits during alternate lines or turns of the scanning. The Ranger condensers which determine the length of the elements of the contrast image and whose capacity is regularly varied in applying my invention to the Ranger circuits, are the condenser 13 of Figs. 1, 2, 3 of Patent No. 1,848,839, the condensers 16 and 17 of Fig. 1 of Patent No. 1,790,722, and the condensers 42 and 43 of Fig. 2 of Patent No. 1,790,722.

It will be appreciated that it is not necessary to change the length of the elements at the end of each single scanning line, although the best results are obtained by doing so. The change may be made as often as is desired or necessary in order to avoid pattern and line effects in the contrast image.

The operation of the oscillator and detector enclosed in dotted line in Fig. 4 is as follows:

When sufficient current flows through resistor 37, the grid of tube 23 is held at a negative potential sufficient to prevent a current in the plate circuit of this tube. When the current through resistor 37 decreases, there is a corresponding increase in the potential of the grid of tube 23. When this increase in potential reaches a certain value, plate current will start to flow in this tube. This will occur when the voltage across condenser 35 has fallen to "the low trigger value." The plate current flows through the primary of transformer 41. This induces a voltage in the secondary of the transformer which causes the grid of tube 23 to become more positive by virtue of the potential induced on one plate of condenser 36. This results in a further increase in the plate current and a correspondingly further increase in the grid voltage until saturation conditions are attained. At this point, the current through the primary of transformer 41 becomes momentarily constant and the secondary voltage drops to zero. This causes a decrease in the potential of the grid of tube 23, which produces a corresponding reduction in the current through the primary of transformer 41. This induces in the secondary of the transformer a voltage of the opposite sign and tends to make the grid of tube 23 even more negative. This process continues until the grid of tube 23 becomes so negative that the plate current ceases. Current then flows through the resistor 44 in such a direction as to again cause the potential of the grid of tube 23 to increase. These oscillations will now continue until the grid of tube 23 is biased to a certain negative voltage, dependent partly on the amount of feed-back from the secondary of the transformer 41 and partly on the value of resistor 44, when the oscillations will cease. This negative value is attained when the plate current in tube 22 increase, thereby increasing the voltage drop across resistor 37. This occurs when the voltage across condenser 35 has attained "the high trigger value." Hence, "the low trigger value" is determined by the bias necessary to start oscillation in the oscillator and detector circuit while it is in a static condition, whereas "the high trigger value" is determined by the bias necessary to stop the oscillation when the oscillator and detector are in a dynamic condition.

Tube 24 is operated as a detector, its grid being biased normally slightly below the cut-off potential. During one-half of the oscillation period of tube 23, the voltage induced in the secondary of transformer 41 causes the grid of tube 24 to become positive allowing current to flow in the plate circuit through the resistor 38. Since the oscillations of tube 23 are at a radio frequency, the oscillations of this tube result in a pulsating unidirectional current through resistor 38 which to all intent and purpose may be regarded and treated as a direct current. It is obvious to one skilled in the art that this oscillator and detector might be replaced by a direct current amplifier containing an odd number of stages.

What I claim is:

1. The combination with a photo-electric facsimile device including a mechanism for moving an original and a copy in a series of corresponding scanning lines and scanning and recording devices connected by an electric circuit having a cyclic operation, of means operated by said moving mechanism at spaced scanning lines to modify said electric circuit to alter its time constant and operated by said moving mechanism at intermediate scanning lines to restore said electric circuit to its original condition.

2. The combination with a photo-electric facsimile device including a mechanism for moving an original and a copy in a series of corresponding scanning lines and scanning and recording devices connected by an electric circuit containing a condenser which is alternately charged and discharged by currents controlled by a photo-cell scanning an original, of means periodically operated by said moving mechanism to cause equal percentage changes in the charging and discharging periods of the condenser.

3. The combination with a photo-electric facsimile device including a mechanism for moving an original and a copy in a series of corresponding scanning lines and scanning and recording devices connected by an electric circuit containing capacity connected to a photo-cell scanning an original, of means operated by said moving mechanism at each of a number of spaced lines to increase the capacity of the circuit by a predetermined small increment and operated by said moving mechanism at intermediate scanning lines to decrease the capacity of the circuit by a decrement equal to said increment.

4. The combination with a photo-electric facsimile device including a mechanism for moving an original and a copy in a series of corresponding scanning lines and scanning and recording devices connected by an electric circuit containing a condenser which is alternately charged and discharged, of an auxiliary condenser of less capacity than said condenser, a circuit connecting the auxiliary condenser in parallel with said condenser, a switch in said circuit, and means operated by said moving mechanism for periodically closing and opening said switch.

5. The combination with a photo-electric facsimile device including scanning and recording devices connected by an electric circuit containing a condenser, of a plurality of auxiliary condensers, and means for periodically connecting various numbers of said condensers in parallel with the condenser of the scanning device.

6. The combination with a photo-electric facsimile device including a mechanism for moving an original and a copy in a series of corresponding scanning lines and scanning and recording devices of the type adapted to scan a continuous-tone original and make a contrast image in which the tones of the original are represented by the relative sizes of small black and white areas, of means operated by said moving mechanism at spaced scanning lines to change the sizes of the black areas and simultaneously make an equal percentage change in the sizes of the white areas and operated by said moving mechanism at intermediate scanning lines to restore the original sizes of the black and white areas.

MORRIS SORKIN.